United States Patent [19]

Hoshino

[11] Patent Number: 5,315,062
[45] Date of Patent: May 24, 1994

[54] WIRE HARNESS CONNECTOR COVER

[75] Inventor: Kazuhiro Hoshino, Iwate, Japan

[73] Assignee: Sumitomo Wiring Systems, Ltd., Yokkaichi, Japan

[21] Appl. No.: 795,545

[22] Filed: Nov. 21, 1991

[30] Foreign Application Priority Data

Nov. 21, 1990 [JP] Japan .................. 2-122554

[51] Int. Cl.⁵ .............. H02G 3/08; H01R 13/627; H01R 13/62
[52] U.S. Cl. .................. 174/52.1; 174/72 R; 174/72 C; 439/359; 439/368; 439/372
[58] Field of Search ........... 174/135, 71 R, 72 A, 174/72 R, 92, 52.1, 145, 72 C; 439/506, 610, 359, 372, 368

[56] References Cited

U.S. PATENT DOCUMENTS

| | | | |
|---|---|---|---|
| 2,619,515 | 11/1952 | Doane. | |
| 3,711,633 | 1/1973 | Ghirardi et al. | 174/71 R |
| 4,708,663 | 11/1987 | Eckart | 439/469 |
| 4,797,512 | 1/1989 | Kumagai et al. | 174/135 |
| 4,838,808 | 6/1989 | Fujiura | 439/610 |
| 5,022,865 | 6/1991 | Wright et al. | 439/368 |

Primary Examiner—Leo P. Picard
Assistant Examiner—Bot Ledynh
Attorney, Agent, or Firm—Sughrue, Mion, Zinn, Macpeak & Seas

[57] ABSTRACT

A connector cover for a wire harness includes a main cover composed of a hinged pair of half case bodies and a secondary cover composed of a hinged pair of semicylindrical bodies. The main cover is formed with an opening for affixing to the back of the connector and a circular opening with a circular ridge elongating inside surface for passing the wire extending from the connector when the half case bodies are closed. The secondary cover has both ends opened for receiving the wire harness and is formed with a cylindrical opening with a channel grove extending therearound for passing the wire when the semicylindrical bodies are closed, and is connected to the main cover such that the circular ridge of the main cover fits in the channel groove around the cylindrical opening. Accordingly, the secondary cover can rotate with respect to the main cover.

2 Claims, 6 Drawing Sheets

WIRE HARNESS CONNECTOR COVER

BACKGROUND OF THE INVENTION

1. Field of the Invention

The present invention relates to a connector cover which protectively covers a wire harness and an electrical connector such as a socket plug at the connecting members therebetween, and is particularly suited to covering the electrical connector members joined with the wire bundle extending from the wire harness for use in automobiles and other similar applications.

2. Description of the Prior Art

The connecting members of electrical wire harness and the corresponding connectors, or electrical socket plugs, are commonly covered and protected by a rubber or PVC cover to protect the connecting members from grease and other problems, particularly when the connection is related to important vehicle control circuits and passenger safety circuits.

Covers are likewise used to protect the wire bundles to a wire harness from edges and burrs in the vehicle and from damage during such operations as tightening bolts.

However, in the case that the rubber cover is installed to the connecting member while it is connected with the wire harness and the electrical socket plugs, the wire connecting member with the socket plug must be disconnected from the working table in which the wire harness is connected to the socket plug. Then, a grommet spreader or other device is used to spread the cover for fitting the connecter member in. This can be a tedious task. With PVC covers, for which a spreader cannot be used, the terminals must be crimped to the wire, the wire then passed through the cover, and finally the terminals crimped to the wire inserted to the connectors, a time-consuming operation that requires the cover to the installed before the connection is made. As thus described, productivity is low during the wire harness production and connection process.

SUMMARY OF WE INVENTION

The present invention has been developed with a view to substantially solving the above described disadvantages and has for its essential object to provide an improved wire harness connector cover.

In order to achieve the aforementioned objective, a connector cover, means which is used to protectively cover a wire extending between a wire harness and a connector used for an electric connection with electric components comprises a holding means for holding the connector and a covering means for the wire.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
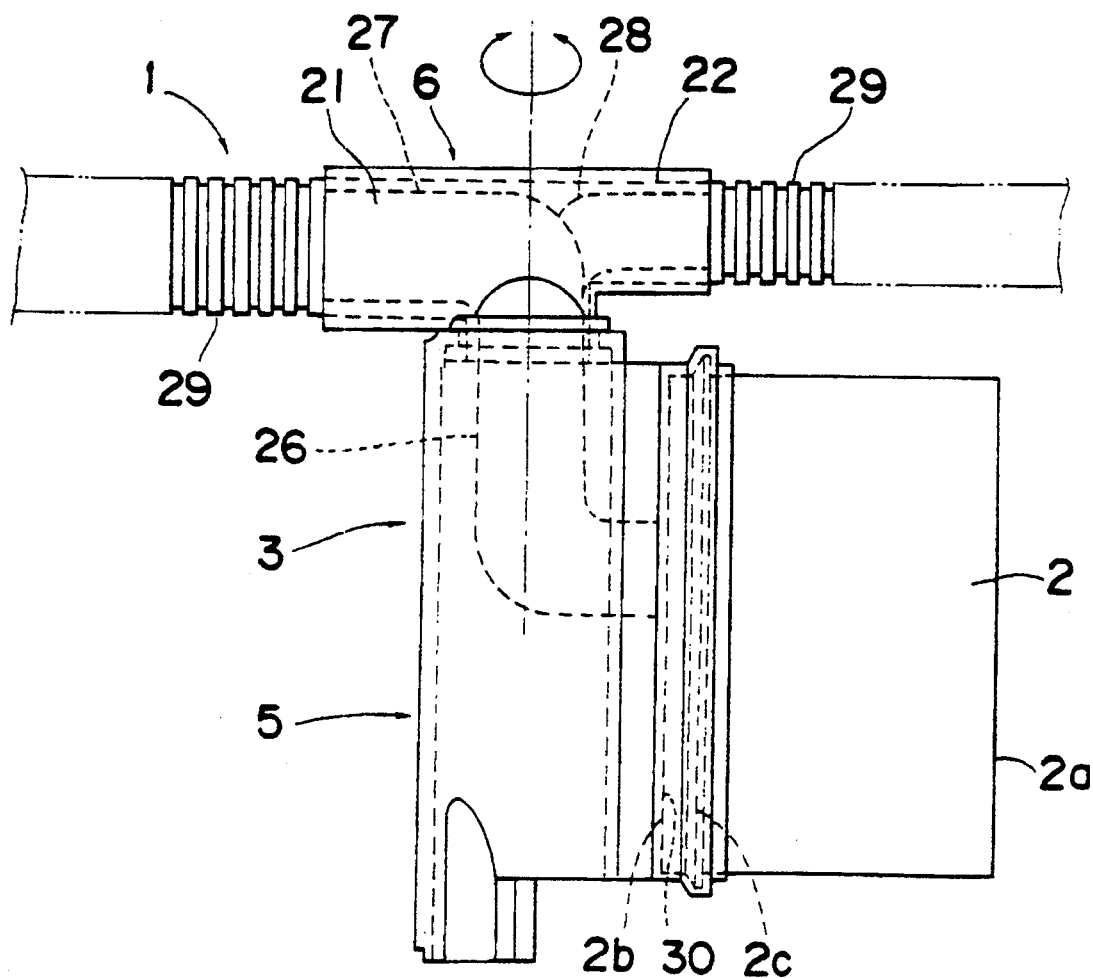
FIG. 1 is a side view showing a connector cover, according to an embodiment of the present invention, applied between a connector plug and a wire harness.
Figure 8:
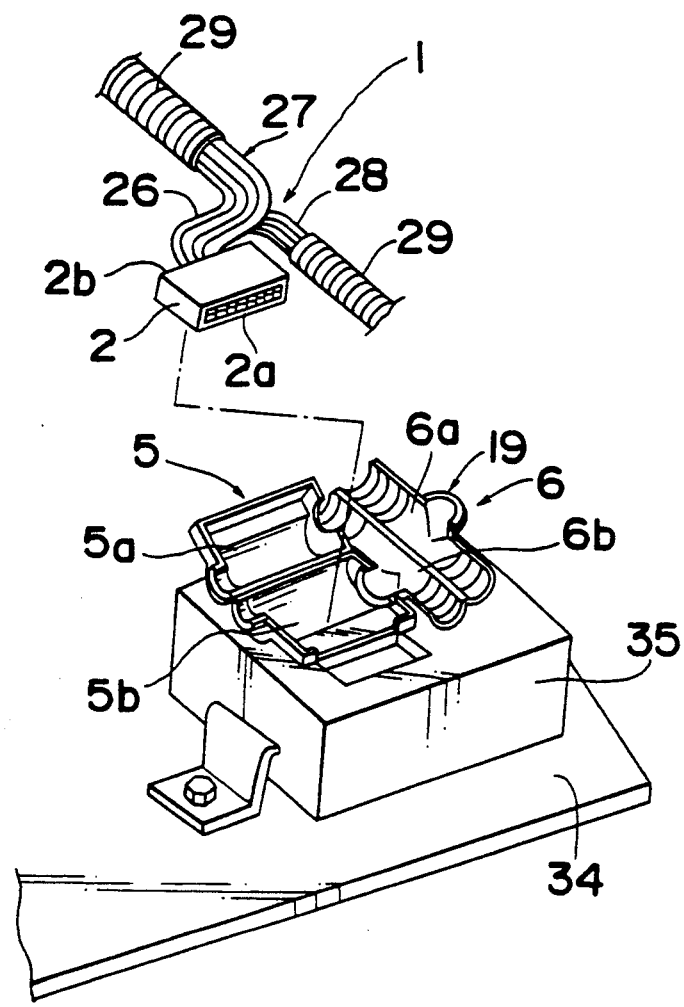
FIG. 8 is a schematic perspective view illustrating the operation to install wire harness with the connector socket to the connector cover according to the present embodiment.

Referring to FIG. 1, a connector 2 and a wire harness 1 are shown with an application of a connector cover 3 of the present invention. First, the arrangement of the connector 2 and wire harness 1 is explained. As best shown in FIG. 8, the connector 2 is, for example, a female connector having a rectangular box-like configuration with long side faces 2a and 2b and two short side faces. At one long side face 2a, connecting sockets are formed for receiving connection pins of a male connector (not shown). Any other type of connector 2 can be employed other than the female connector. A wire bundle 2b extends from the other long side face 2b of the connector 2. The wire bundle 26 extends from the end portion of the wire harness 1 through a main wire bundle 27 portion. Furthermore, another wire bundle extends from the side face 2b, and is a branching wire 28 for the wire harness 1. The wire harness 1 is covered by corrugated tubes 29 at the main wire bundle 27 and the branching wire 28 remote from the connector 2. The connector 2 is provided with a flange portion 2c which extends around the connector 2 or a flat surface at a position adjacent and parallel to the long side face 2b (see FIG. 1).

As illustrated in FIG. 1, connector cover 3 is provided to receive a portion of the wire harness 1 and a portion of the connector 2, so that wire bundles 26, 27, and 28, and a portion of the connector 2 including the long side portion 2b are covered by the connector cover 3.

The connector cover 3 comprises a main cover 5 for receiving the connector 2 and the wire bundle 26 and a secondary cover 6, connected to the main cover 5, for receiving wire bundles 27 and 28.

Figure 3:
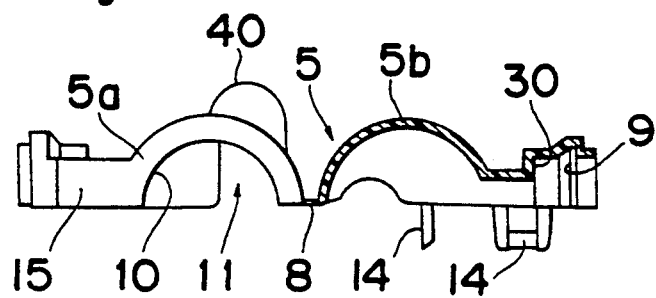
FIG. 3 is a partially schematic sectional view of the main cover taken along lines III—III of FIG. 2.
Figure 2:
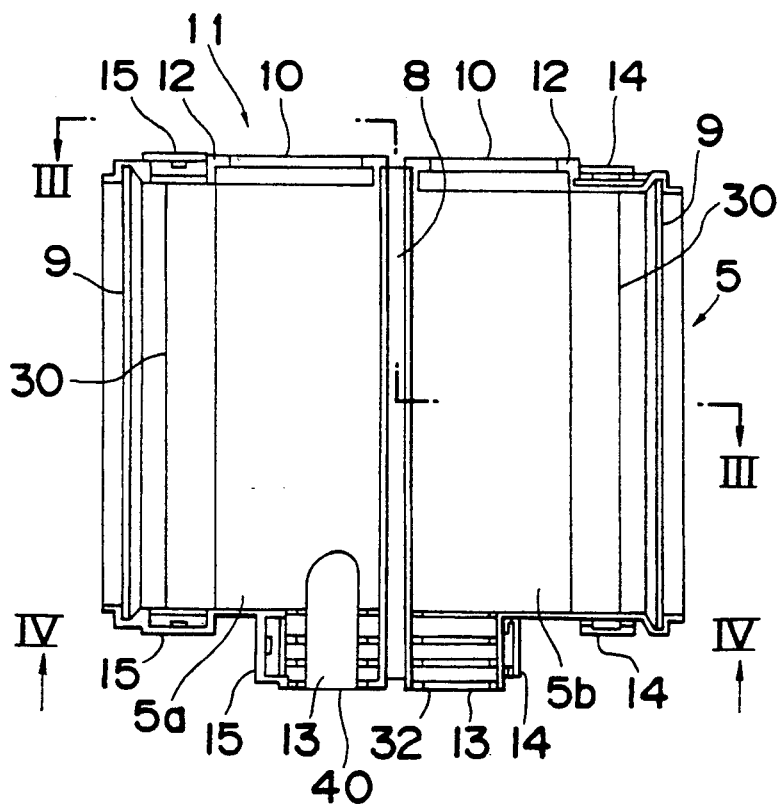
FIG. 2 is a plan view showing a main cover of connector cover of FIG. 1, which is pivotally opened.
Figure 4:
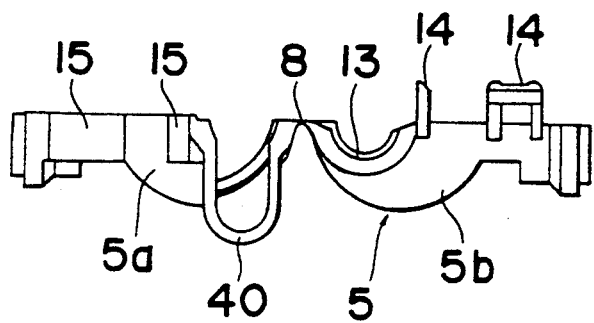
FIG. 4 is a bottom view of the main cover shown in an direction of arrow IV of FIG. 2.

Referring to FIGS. 2, 3, and 4, the main cover 5 according to a preferred embodiment of the present invention is shown. The main cover 5 comprises first and second half case bodies 5a and 5b integrally molded from polypropylene or another authentic resin. Each of the first and second half case bodies 5a and 5b has two long sides and two short sides, respectively, as best shown in FIG. 2. Between the half case bodies 5a and 5b, a hinge portion 8 is formed so that the half case bodies 5a and 5b can pivot on the hinge portion 8 to close on themselves to form the complete connector cover 5.

On the inside surfaces of the half case bodies 5a and 5b remote form the hinge portion side, a channel groove 9 is formed. Furthermore, in parallel to the channel groove 9, an elevation wall 30 is provided on the inner surface of the half case bodies 5a and 5b so that an elongated space is obtained between the end edges of the walls 30 and 30 when the half case bodies 5a and 5b are so as to permit the wire bundle 26 to pass therethrough.

The main cover 5 can hold the connector 2 by engaging the flanged portion 2c in channel groove 9 and abutting the long side face 2b of the connector 2 against the elevation wall 30 when the half case bodies 5a and 5b are closed with the connector 2 inserted therein.

On one short side of each of the half case bodies 5a and 5b, semicircular notch 10 is formed. When half case bodies 5a and 5b are closed, the semicircular notches 10 form a circular hole 11, through which the wire bundle 26 can be passed into the main cover 5. Around the circumference of the semicircular notch 10, a connecting flange 12 is formed which has a constant thickness extends toward the center of the notch 10.

On the other short side of each of the half case bodies 5a and 5b, a projecting portion is provided in which a semicircular channel 13 is formed. When the half case bodies 5a and 5b are closed, a circular channel 13 is formed, which functions as an auxiliary wire bundle guide for passing the wire bundle 26 therethrough. Furthermore, at the middle portion of the semicircular channel 13 at the half case body 5a, as best shown in FIG. 4, a generally U shaped projecting portion 40 is formed, through which any wire such as an grounding wire can be taken out the auxiliary wire bundle. In the embodiment shown, such an auxiliary wire bundle is not shown. On the inner surface of the projecting portion, a plurality of circular ridges 32 are formed which are spaced at constant pitch, as shown in FIG. 2. It is to be noted that the projecting portion with channels 13 may be deleted or may be formed as part of the secondary cover 6.

Furthermore, for holding half case bodies 5a and 5b together to form a complete main cover 5, one or more pairs of male engaging portion 14 and female engaging portion 15 is formed at appropriate positions of the edges of the half case bodies 5a and 5b, respectively. The male and female engaging portions 14 and 15 are held together in an engaged manner when the half case bodies 5a and 5b are closed together. It is to be noted that the male and female engaging portion 14 and 15 can be easily disengaged when required. For example, in this embodiment each c)ne of male engaging portion 14 and female engaging portion 15 is provided at each short side of the half case bodies 5a find 5b and also at side edges of channel portion 13 near the channel groove 9.

Figure 5:
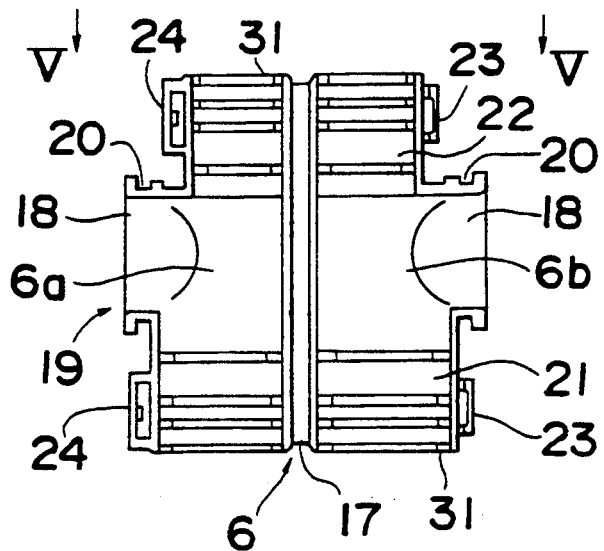
FIG. 5 is a plan view showing a secondary cover of connector cover cf FIG. 1, which is pivotally opened.
Figure 6:
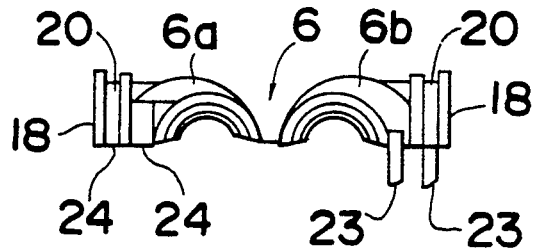
FIG. 6 is a top view of the secondary cover shown in an direction of arrow V—V of FIG. 5.
Figure 7:
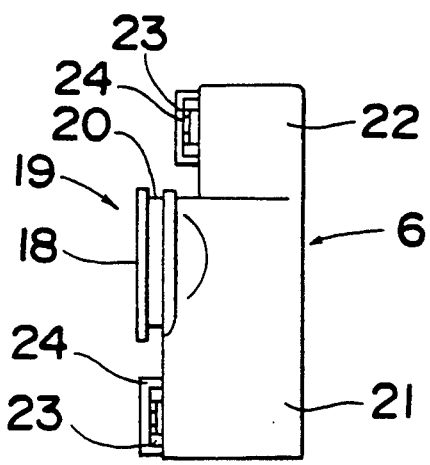
FIG. 7 is a side view of the secondary cover of FIG. 5, which is pivotally closed.

Referring to FIGS. 5, 6, and 7, the secondary cover 6 according to the preferred embodiment of the present invention is shown. The secondary cover 6 is comprised of a pair of integrally molded semi-cylindrical bodies 6a and 6b formed from polypropylene or another plastic resin. The semi-cylindrical bodies 6a and 6b are connected to each other by a hinge portion 17. On one side of each of the semi-cylindrical bodies 6a and 6b is formed a semi-cylindrical body 18 such that when the semi-cylindrical bodies 6a and 6b are closed about the hinge portion 17, the semi-cylindrical bodies 18 form a cylindrical opening extending in a direction perpendicular to the hinge portion 17. The outer circumference of the semi-cylindrical bodies 18 are formed with a circular channel groove 20, which mates with the flange 12 of the main cover 5. The semi-cylindrical bodies 18 when closed together thus form a cylindrical connecting member 19 together with the groove 20 for the connection with the circular hole 11 of the main cover 5. Thus the secondary cover 6 rotates freely with respect to the main cover 5.

The secondary cover 6 has the large diameter main cylindrical chamber 21 and the small diameter cylindrical branching chamber 22 formed to have their axes extending parallel to each other and also parallel to the hinge portion 17. The secondary cover 6 is further provided with a plurality of circular ridges 31 formed at a constant pitch on the inside surface of the main chamber 21 and the branching chamber 22, as shown in FIG. 5. It is to be noted that similar circular ridges 32 are formed on the inside surface of the channels 13 of the main cover 5, as shown in FIG. 2.

Furthermore, one or more pairs of male engaging portion 23 and female engaging portion 24 is formed at appropriate positions of the edges of the semi-cylindrical bodies 6b and 6a, respectively. The male and female engaging portions 23 and 24 are held together in an engaged manner when the semi-cylindrical bodies 6a and 6b are closed together. It is to be noted that the male and female engaging portions 23 and 24 can be easily disengaged when required. For example, in this embodiment each one of male and female engaging portions 23 and 24 are provided to the main and branching chambers 21 and 22 of semi-cylindrical bodies 6a and 6b at side edge of apart from the hinge portion 17.

As shown in FIG. 1 and FIG. 8, wire bundles 27 and 28 are covered with a protective corrugated tubes 29. The corrugated tube 29 is composed of a flexible tube having a plurality of ribs at a constant pitch, each rib extending along the circumference of the tube. The corrugated tube 29 is held by the secondary cover 6 such that the ridges 31 of the secondary cover 6 and the circular ribs of the corrugated tubes 29 engage each other.

As illustrated in FIG. 8, the wire harness 1 applied with the corrugated tube 29 is covered by the main cover 5 and secondary cover 6, according to the above described embodiment, as follows. The main cover 5 and secondary cover 6, which are opened, are located on a connector receiving jig 35 mounted on an assembly table 34. At this time, the main cover 5 and secondary cover 6 are so set that the connecting flange 12 of the half case bodies 5b and the channel members 20 of the semi-cylindrical bodies 6b are engaged together. The connector 2 and wire bundle 26 are placed in the main cover 5 and the mean bundle 27 and branch bundle 28 are placed in the secondary cover 6. The secondary cover 6 is closed and then the main cover 5 is closed. As thus described, the mounting of the connector covers 5 and 6 can be easily carried out on a flat surface, assuring excellent productivity.

When the wire harness 1 is installed in the automobile, secondary cover 6 can rotate freely with respect to the main cover 5, because they are connected together by means of the channel members 20 and corresponding connecting flange 12. Since the connector 2 can rotate freely relative to the wire harness 1, it is possible to socket the connector 2 even at a position which is difficult to access. Thus the installations of the wire harness 1 to the automobile can be improved.

Figure 9:
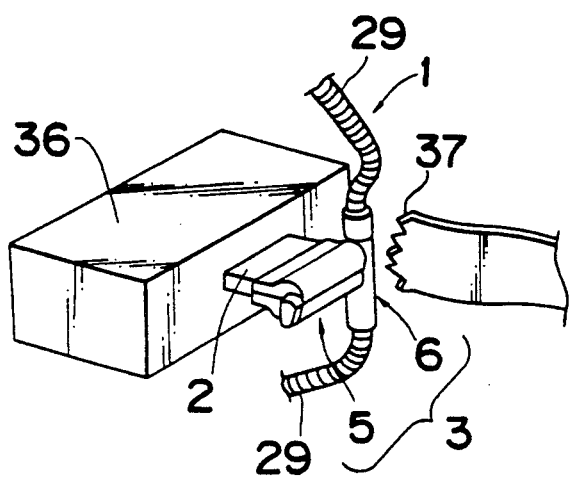
FIG. 9 is a schematic perspective view showing the operation to install the wire harness assembly to the connector cover according to the present invention to an automobile.

Referring to FIG. 9, a condition in which a connector 2 is socketed to an electrical component 36 located near a burred edge 37 is shown. In this case, the burred edge 37 will be an obstruction against the wire harness when socketing the connect to the electric components 36. According to the present invention, however, since the wire harness 1 can be rotated at the portion where the secondary cover is engaged in the main cover 5, the connector 2 can be easily handled even with such an obstruction. In addition, the wire harness 1 can be easily moved to a required position after the connector 2 is completely connected. As apparent from the above, since the main cover 5 and secondary cover are provided, the branched wire bundle 28 and the wire bundle 27 extending immediately after the connector 2 can be protected from being damaged by the edges and burrs 37 during the socketing of the connector 2.

Furthermore, when a tape is wound around the wire bundle branching immediately after the connector 2 for securing thereof as conventionally employed, there is little freedom of movement between the branching and main wire bundles. In such a case undesirable unsocketing forces may be applied to the connector, resulting in the disconnection of the connector. According to the present invention, however, the wire bundles 27 and 28 are protectively restrained by the secondary cover 6, and at the same time are free to move rotationally with respect to the connector 2. Thus, such an undesirable unsocketing force will not be produced. In addition, the branching of the wire bundle immediately after the connector 2 can be accomplished in a comparatively small space.

Maintenance is also improved because the ability to rotate the secondary cover 6 with respect to the main cover 5 enables easy disconnection of the connector 2.

Figure 10:
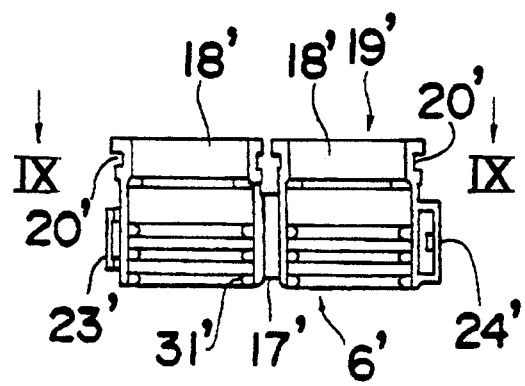
FIG. 10 is a plan view showing an alternation of secondary cover according the present invention, which is pivotally opened.
Figure 11:
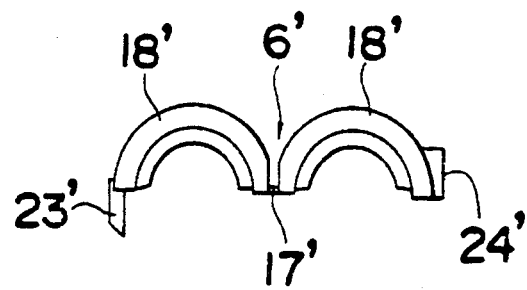
FIG. 11 is a top view of the secondary cover showing in an direction of arrow XI of FIG. 10.
Figure 12:
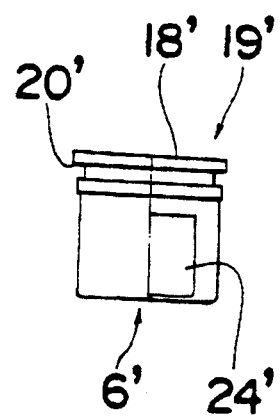
FIG. 12 is a side view of the secondary cover, which is pivotally closed.

Referring to FIGS. 10, 11, and 12, an secondary cover 6 according to a second embodiment is shown. In this alternation, a secondary cover 6' has generally a straight cylindrical body which guides the wire bundle 26 in the axial direction through the cylindrical connecting member 19'. As in a similar structure to that of the above described secondary cover 6, the secondary cover 6' is comprised of a pair of integrally molded semi-cylindrical bodies connected to each other by a hinge portion 17' so as to form a complete secondary over 6' of an cylindrical body. On one end of the cylindrical body 6' is a cylindrical opening 19' formed by a pair of a semi-cylindrical opening 18', through which a wire bundle 26 extends. The outer circumference of the semi-cylindrical bodies 18' are formed with a circular channel groove 20', which mates with the flange 12. Furthermore, on the other end, a plurality of circular ridges 31' are provided on an inner surface thereof, at which the wire bundle 26 is clamped. Furthermore, a pair of male and female engaging portions 23' and 24' are provided on one side thereof.

Figure 13:
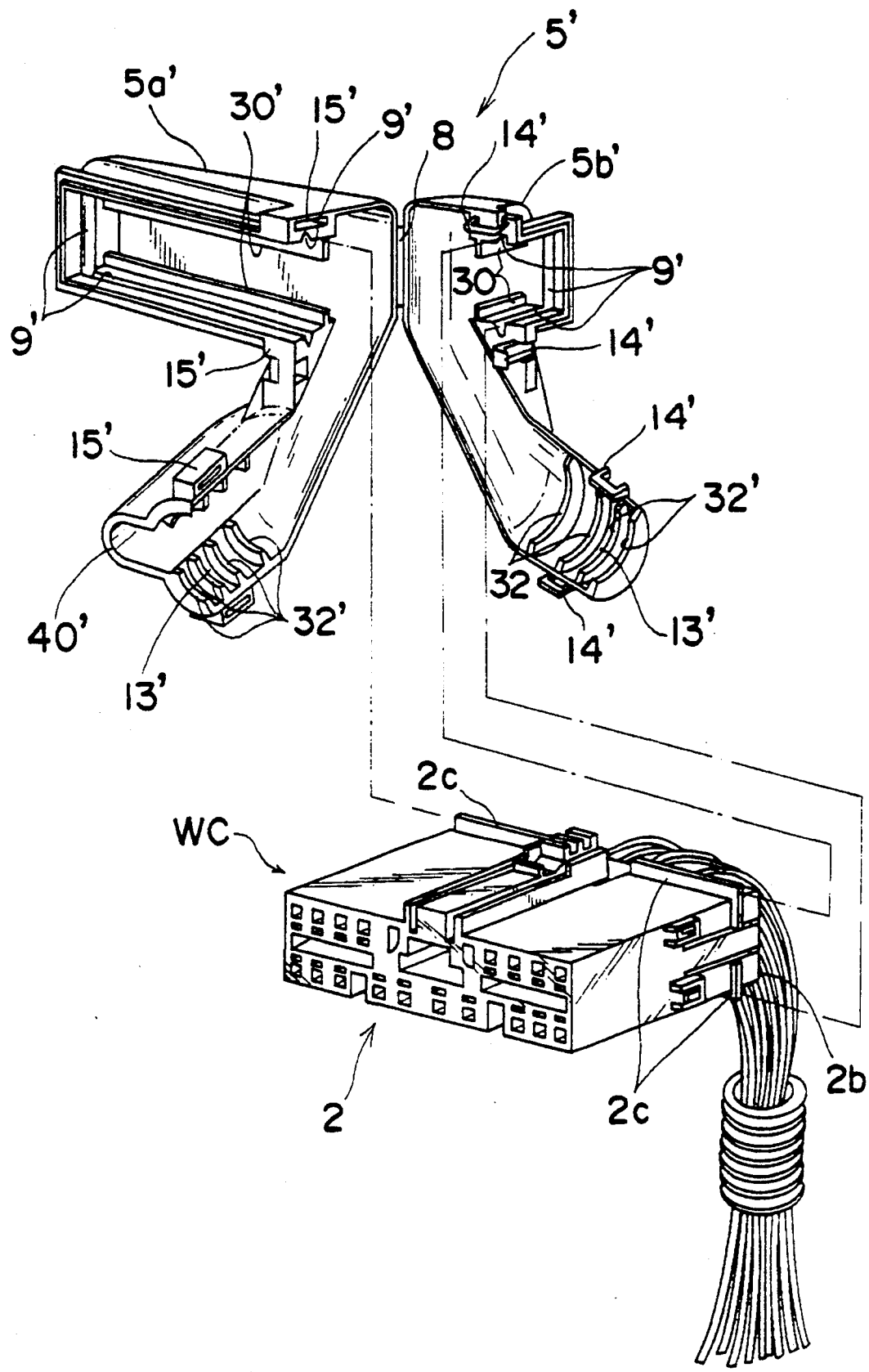
FIG. 13 is a schematic perspective view showing the operation to install the wire harness assembly to an alternative connector cover of the embodiment according to the present invention.

Referring to FIG. 13, main cover 5 according to another embodiment of the present invention is shown. In this embodiment, a main cover 5' has a structure similar to that of the main cover 5 shown in FIG. 2 as described below. The main cover 5' also comprises first and second half case bodies 5a' and 5b' with a hinge portion 8' therebetween integrally molded from polypropylene or another authentic resin. The first and second half case bodies 5a' and 5b' taken together in a closed state form a rectangular box having two long side surfaces, two short side surfaces, a back side surface, and an opening at one side thereof. Along the inside surface of the main cover 5', a channel groove 9' is formed and elevation walls 30' are provided along the two opposite long side surfaces for receiving the connector 2 at flanged portion 2c and at the long side face 2b. Furthermore, for holding the half case bodies 5a' and 5b' together, a suitable number of pairs of male and female engaging portions 14' 15 are formed at appropriate positions of the edges of the half case bodies 5a' and 5b', respectively.

According to the embodiment shown in FIG. 13, the hinge portion 8' is substantially perpendicular to the directions in which the channel groove 9' and the elevation wall 30' extend. Furthermore, a channel portion 13' extends from one of long side faces and has a plurality of ridges 32' formed at the constant pitch around the inside circumference thereof. Furthermore, at the middle portion of the channel portion 13' at the half case body 5a', a generally U shaped projecting portion 40' is formed for taking out any wire such as an grounding wire therethrough. It is to be noted that the channel groove 9' can be formed in a projected form instead of a grooved form so as to engage with the connector 2 having a groove instead of the flanged portion 2c.

Mounting of the main cover 5' to a wire-connector assembly WC is accomplished by simply inserting the assembly WC in the half case body 5a, by guiding the flanged portion 2c of the connector 2 along the channel groove 9a' with the long side face 2b abutting the elevation walls 30', and by placing the wire bundles inside the channel 13'.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A connector cover which is used to protectively cover a wire connecting a wire harness to a connector means at a connection portion of said connector means which serves to connect said wire to electric components, said connector cover comprising;

first cover means for holding said connector and covering said wire at portions thereof which are near said connector, said first cover means comprising a pair of integrally molded half bodies connected to each other by a hinge portion each of said half bodies being provided with an arched portion at one side edge thereof and a semicircular portion at another side edge thereof, said arched portions defining an opening which is shaped so as to receive a portion of said connector and said semicircular portions defining a circular opening for allowing said wire to pass through said cover when said half bodies are closed around said hinge portion; and a second cover means for covering said wire at portions thereof which are near said wire harness, said second cover means comprising a pair of integrally molded cylindrical half bodies connected to each other by a hinge portion, each of said half bodies being provided with a first semicylindrical portion at one side thereof and a second semicylindrical portion another side thereof so as to form an opening for allowing said wire to pass therethrough from said wire harness to said first cover means.

2. A connector cover as claimed in claim 1, further comprising:

a semicircular ridged portion having a predetermined thickness, formed inside at least one of said semicircular portions of said integrally molded half bodies so as to constitute a circular ridge when said integrally molded half bodies are closed; and a recessed portion having said predetermined thickness defined around at least one of said semicylindrical portions, said circular ridge being received in said recessed portion so as to connect said first and second cover means.

* * * * *